(12) United States Patent
Dominique

(10) Patent No.: US 10,254,190 B2
(45) Date of Patent: Apr. 9, 2019

(54) MODULAR TESTING FIXTURE

(71) Applicant: SOLAR TURBINES INCORPORATED, San Diego, CA (US)

(72) Inventor: Drew Allen Dominique, Lakeside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 261 days.

(21) Appl. No.: 15/273,269

(22) Filed: Sep. 22, 2016

(65) Prior Publication Data
US 2018/0080845 A1    Mar. 22, 2018

(51) Int. Cl.
*B25B 1/00* (2006.01)
*G01M 1/00* (2006.01)

(52) U.S. Cl.
CPC .................................... *G01M 1/00* (2013.01)

(58) Field of Classification Search
CPC . G01M 1/00; B25B 1/00; B25B 11/00; B25B 5/14; B23Q 3/00; B23Q 1/66; B23Q 1/00; B23Q 3/062; B23Q 3/1558; B23Q 17/002; B23Q 17/12; B23Q 3/063; Y10T 29/49998; Y10T 29/53961; Y10T 29/49336; Y10T 29/4932; Y10T 29/37; F01D 25/285; F05D 2230/80; B24B 19/14; B23P 6/002

USPC .......... 29/281.1, 559, 889.2, 889.7; 269/228, 269/291, 74
See application file for complete search history.

(56) References Cited

U.S. PATENT DOCUMENTS 6,367,359 B1 * 4/2002 Ropos ............... B23B 29/03467
82/1.4

OTHER PUBLICATIONS

See attached STIC search history.*

* cited by examiner

*Primary Examiner* — Monica S Carter
*Assistant Examiner* — Abbie E Quann
(74) *Attorney, Agent, or Firm* — Procopio, Cory, Hargreaves & Savitch LLP

(57) ABSTRACT

A testing fixture for testing a component of an industrial machine is disclosed herein. The testing fixture includes a fixture block and a component interfacing fixture that fastens to the fixture block. The fixture block includes a block tapered bore that forms a block tapered bore wall. The block tapered bore wall includes a block tapered surface with a frustoconical shape. The component interfacing fixture includes a receiving slot for the component and a stem. The stem includes a tapered portion that has a stem tapered surface with a frustoconical shape that mates with the block tapered surface.

20 Claims, 9 Drawing Sheets

MODULAR TESTING FIXTURE

TECHNICAL FIELD

The present disclosure generally pertains to a modular testing fixture, and is directed toward a modular testing fixture for high cycle fatigue and modal testing of industrial machine components.

BACKGROUND

Components for industrial machines, such as high speed rotary machines, may operate in harsh conditions and are generally tested to determine the viability of the component's design and to determine how long the component may be used within the industrial machine before it is replaced. Testing fixtures are generally used to hold the component during the testing processes. Testing fixtures may be large, heavy, cumbersome, and may require a significant amount of storage space.

The present disclosure is directed toward overcoming one or more of the problems discovered by the inventors or that is known in the art.

SUMMARY OF THE DISCLOSURE

A testing fixture for testing a component of an industrial machine is disclosed herein. In one embodiment, the testing fixture includes a fixture block, a component interfacing fixture, a fastener, and a loading mechanism. The fixture block includes a block body with a block front surface and a block tapered bore. The block tapered bore extends into the block body from the block front surface forming a block tapered bore wall. The block tapered bore wall includes a block tapered surface with a first frustoconical shape within the block body where a larger diameter of the first frustoconical shape is adjacent the block front surface. The component interfacing fixture includes an interfacing portion and a stem. The interfacing portion includes a receiving slot that receives a root of the component. The stem extends from the component interfacing fixture opposite the receiving slot and includes a tapered portion and a threaded portion. The tapered portion includes a stem tapered surface with a second frustoconical shape where a larger diameter of the second frustoconical shape is adjacent the interfacing portion. The threaded portion is distal to the interfacing portion. The stem inserts into the fixture block such that the stem tapered surface mates with the block tapered surface. The fastener couples to the threaded portion adjacent the block body opposite the block front surface. The loading mechanism applies a load to the root of the component to secure the root within the receiving slot.

A method for testing a component for an industrial machine using the testing fixture that include a fixture block and a component interfacing fixture is also disclosed herein. In one embodiment, the method includes inserting a root of the component into a receiving slot formed in an interfacing portion of the component interfacing fixture. The method also includes applying a load to the root with a loading mechanism to secure the component to the component interfacing fixture. The method further includes inserting a stem of the component interfacing fixture into a block tapered bore of the fixture block, the block tapered bore extending into a block body of the fixture block from a block front surface of the block body and forming a block tapered bore wall with a block tapered surface that includes a first frustoconical shape with the larger diameter of the block tapered bore wall adjacent the block front surface. The stem extends from the interfacing portion and includes a tapered portion with a stem tapered surface that includes a second frustoconical shape with the larger diameter of the stem tapered surface adjacent the interfacing portion. The stem tapered surface mates with the block tapered surface. The method yet further includes securing the component interfacing fixture to the fixture block to prevent relative motion there between at step by securing a fastener to a fastening portion of the stem that is distal to the interfacing portion and tightening the fastener on the back side of the block tapered bore wall. The method still further includes conducting a material test of the component after the component interfacing fixture is secured to the fixture block to prevent relative motion there between.

DETAILED DESCRIPTION

The systems and methods disclosed herein include a testing fixture for holding a component of an industrial machine during testing of the component, such as high cycle fatigue testing and modal testing. In embodiments, the testing fixture includes a fixture block that can be affixed to a mounting plate and a component interfacing fixture. The fixture block includes a block tapered bore that forms a block tapered bore wall, and the component interfacing fixture includes a stem with a tapered portion that mates with the block tapered bore. The component interfacing fixture can be affixed to the fixture block by securing a fastener to the stem a by tightening down the fastener against the fixture block. The interface between the block tapered bore wall and the tapered portion allows the component interfacing fixture holding a component to rotate relative to the fixture block and orient the component into an optimal position for testing. Further, forming the testing fixture from two components may significantly reduce the amount of weight that an operator is required to lift.

Figure 1:
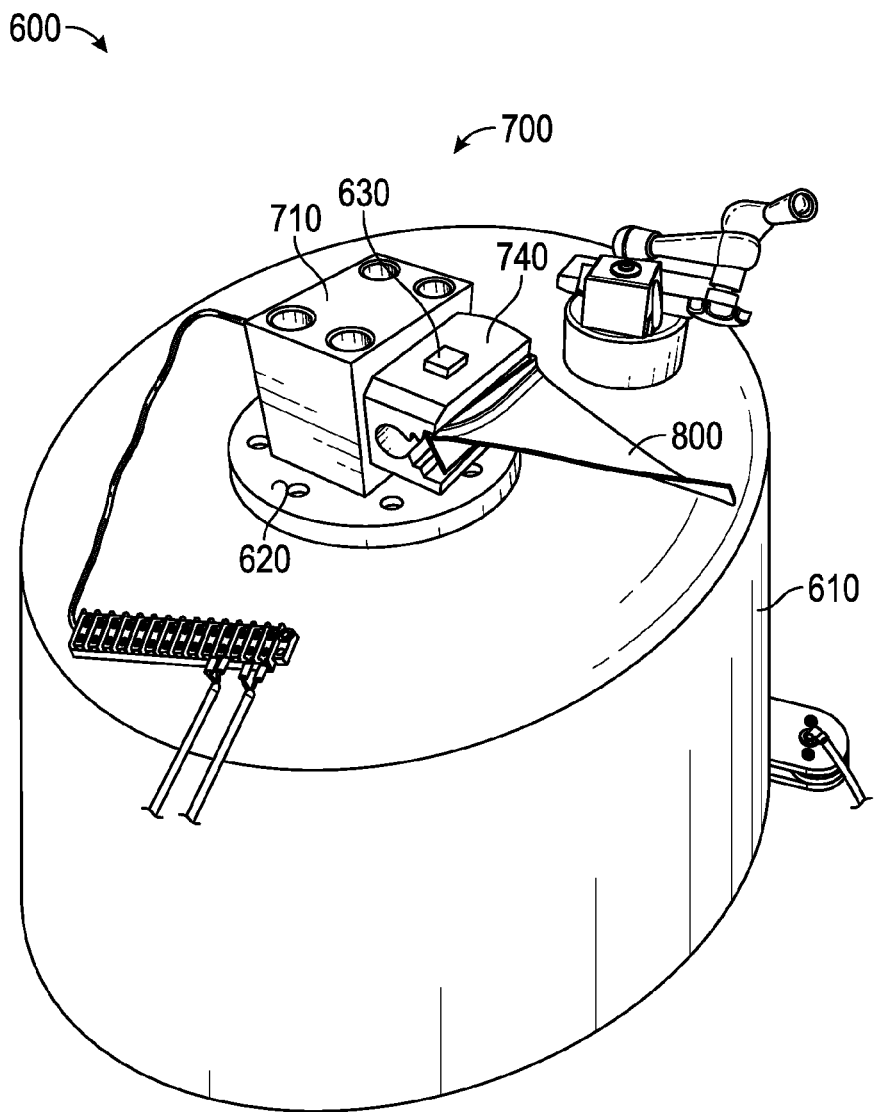
FIG. 1 is a perspective view of a testing mechanism.

FIG. 1 is a perspective view of a testing mechanism 600. The testing mechanism 600 may include a mounting plate 620, the testing fixture 700, a high cycle fatigue testing mechanism 610, such as a shaker table, and a modal testing mechanism 630, such as an exciter. In the embodiment illustrated, the mounting plate 620 is joined to the high cycle fatigue testing mechanism 610. In other embodiments, the mounting plate 620 may be joined to a separate modal testing rig.

Figure 3:
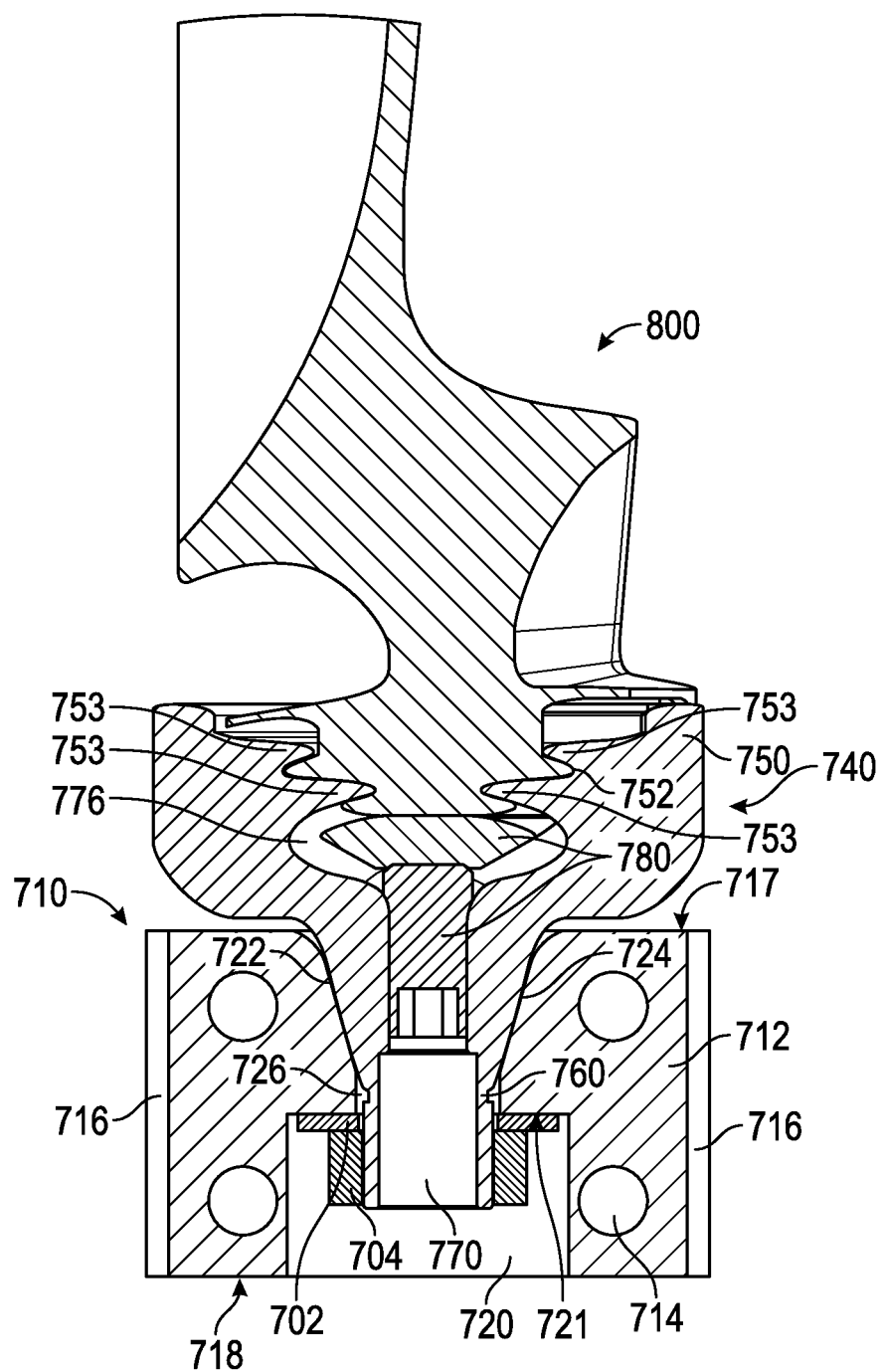
FIG. 3 is a cross-sectional view of the testing fixture and component of FIG. 2 taken along the line III-III.
Figure 4:
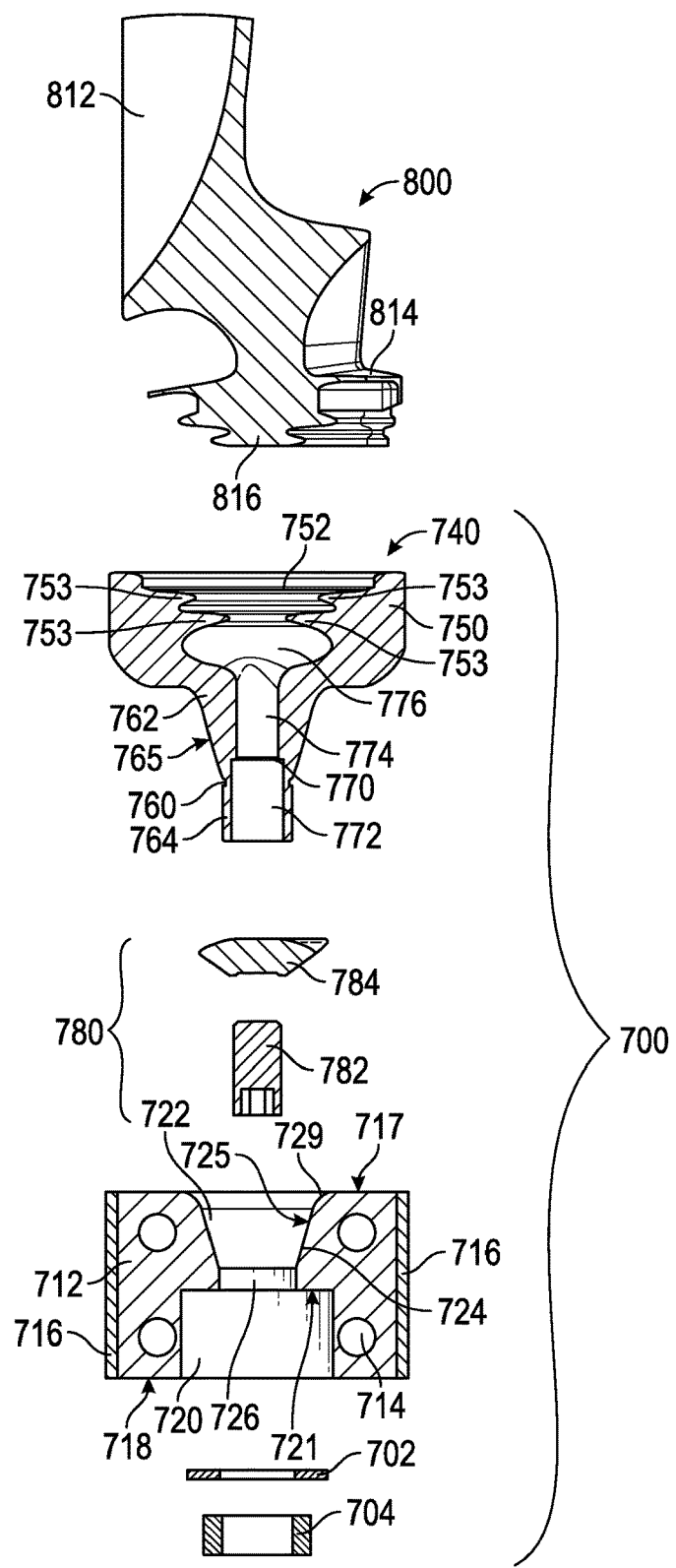
FIG. 4 is an exploded cross-sectional view of the testing fixture and component of FIG. 3.
Figure 9:
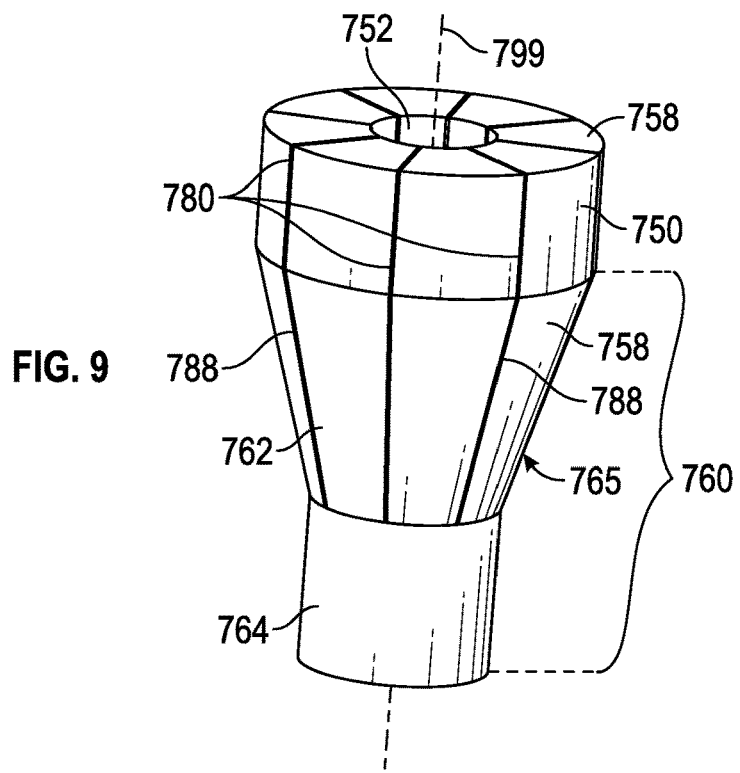
FIG. 9 is another embodiment of the component interfacing fixture.

The testing fixture 700 includes a fixture block 710, a component interfacing fixture 740, and a loading mechanism 780 (refer to FIGS. 3, 4, and 9). The fixture block 710 is coupled to the mounting plate 620, such as by bolting. The fixture block 710 may remain bolted to the mounting plate 620 regardless of the component 800 to be tested. The component interfacing fixture 740 is configured to hold the component 800 during testing and is coupled to the fixture block 710 during testing. Each type of component that is tested may require a different component interfacing fixture 740 to accommodate the size and shape of the component 800. Thus a testing system may include the fixture block 710 and a number of component interfacing fixtures 740 that can each be coupled to the fixture block 710 to hold a component 800.

The modal testing mechanism 630 may affix directly to the component interfacing fixture 740 which may allow for a more direct transfer of forces and vibrations from the modal testing mechanism 630 to the component 800.

Figure 2:
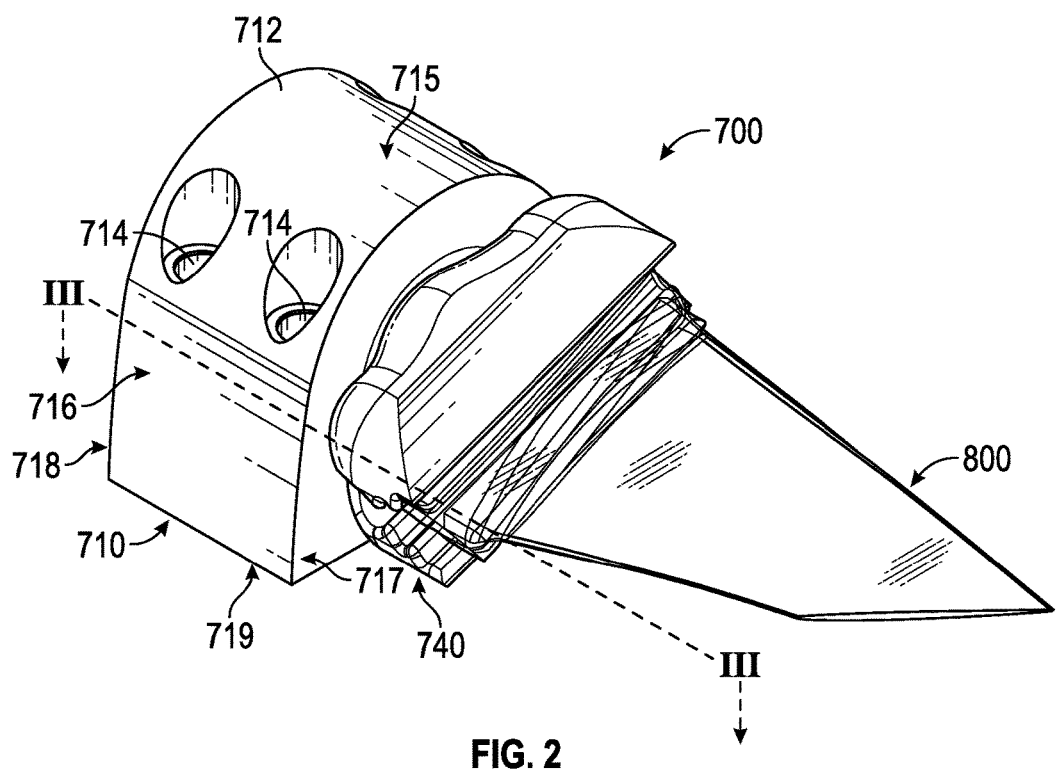
FIG. 2 is a perspective view of another embodiment of the testing fixture of FIG. 1 holding a component for an industrial machine.

FIG. 2 is a perspective view of another embodiment of the testing fixture 700 of FIG. 1 holding a component 800 for an industrial machine. The fixture block 710 may include a block body 712 and block bolt holes 714 extending therethrough to couple the fixture block 710 to the mounting plate 620. The block body 712 may include a block top surface 715, block side surfaces 716 a block front surface 717, a block back surface 718, and a block bottom surface 719. The block bolt holes 714 may extend through the block body 712 from the block top surface 715 to the block bottom surface 719.

FIG. 3 is a cross-sectional view of the testing fixture 700 and component 800 of FIG. 2 taken along the line and FIG. 4 is an exploded cross-sectional view of the testing fixture 700 and component 800 of FIG. 2. Referring to FIGS. 3 and 4, the fixture block 710 may further include a block tapered bore wall 724 located between the block front surface 717 and the block back surface 718. The block tapered bore wall 724 protrudes radially inward from the block body 712.

The fixture block 710 may also include a block tapered surface 725 that may be the inner surface of the block tapered bore wall 724. The block tapered surface 725 may be a frustoconical surface with the larger diameter of the block tapered surface 725 closer to the block front surface 717 than the block back surface 718 and the smaller diameter of the block tapered surface 725 closer to the block back surface 718 than the block front surface 717.

The fixture block 710 may also include a block tapered bore 722, a block counterbore 720, and a block through bore 726. The block tapered bore 722 and the block counterbore 720 may be formed in the block body 712 to form the block tapered bore wall 724 there between. The block counterbore 720 may extend from the block back surface 718 towards the block front surface 717 and toward the block tapered bore 722. The block counterbore 720 may be adjacent the narrow end of the frustoconical shape of the block tapered bore 722. The block tapered bore 722 may extend between two block bolt holes 714 that are adjacent the block front surface 717 and the block counterbore 720 may extend between two block bolt holes 714 that are adjacent the block back surface 718.

In the embodiment illustrated, the block tapered bore wall 724 and the block tapered bore 722 extend from the block front surface 717 towards the block counterbore 720. The edge 729 between the block tapered surface 725 and the block front surface 717 may be rounded. In some embodiments, the block tapered bore wall 724 and the block tapered bore 722 extend to the block counterbore 720. In the embodiment illustrated, the fixture block 710 includes a block through bore 726 that connects the block tapered bore 722 to the block counterbore 720.

Figure 5:
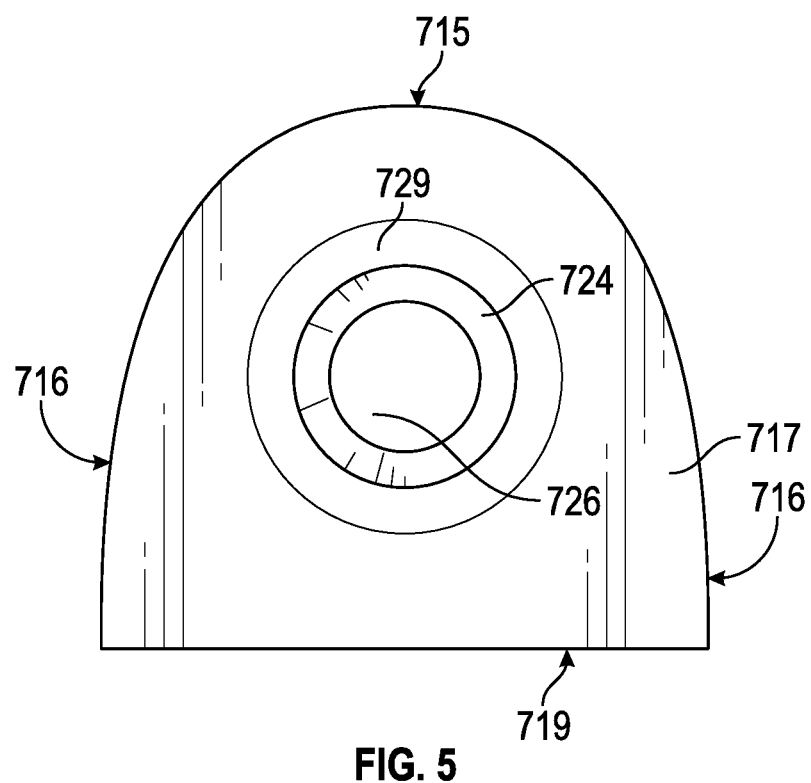
FIG. 5 is a front view of the fixture block of FIGS. 2-4.

FIG. 5 is a front view of the fixture block 710 of FIGS. 2-4. Referring to FIGS. 2 and 5, the block top surface 715 and the two block side surfaces 716 may be curved and may form a curved surface, such as a parabolic cylinder.

Referring again to FIGS. 3 and 4, the component interfacing fixture 740 may include an interfacing portion 750 and a stem 760. The interfacing portion 750 is configured to hold the component 800, such as at the root 816. The interfacing portion 750 is shaped to hold the component 800 and includes a receiving slot 752. In the embodiment illustrated, the component 800 is a bladed component of a rotary machine and in particular is a rotary blade, such as a turbine blade or a compressor blade of a gas turbine engine. In the embodiment illustrated, component 800 includes an airfoil 812, a platform 814, and the root 816. In the embodiment illustrated, root 816 has a root retention shape, such as a fir tree or dove tail shape that fits within a rotary disk slot of a similar shape formed in a rotary disk. The receiving slot 752 may have a root retention feature 753 that has the same or a similar shape as the rotary disk slot and may be configured to simulate the conditions of the rotary blade under a load in the rotary machine. In the embodiment illustrated, the receiving slot 752 and the root 816 include a fir tree shape.

Figure 6:
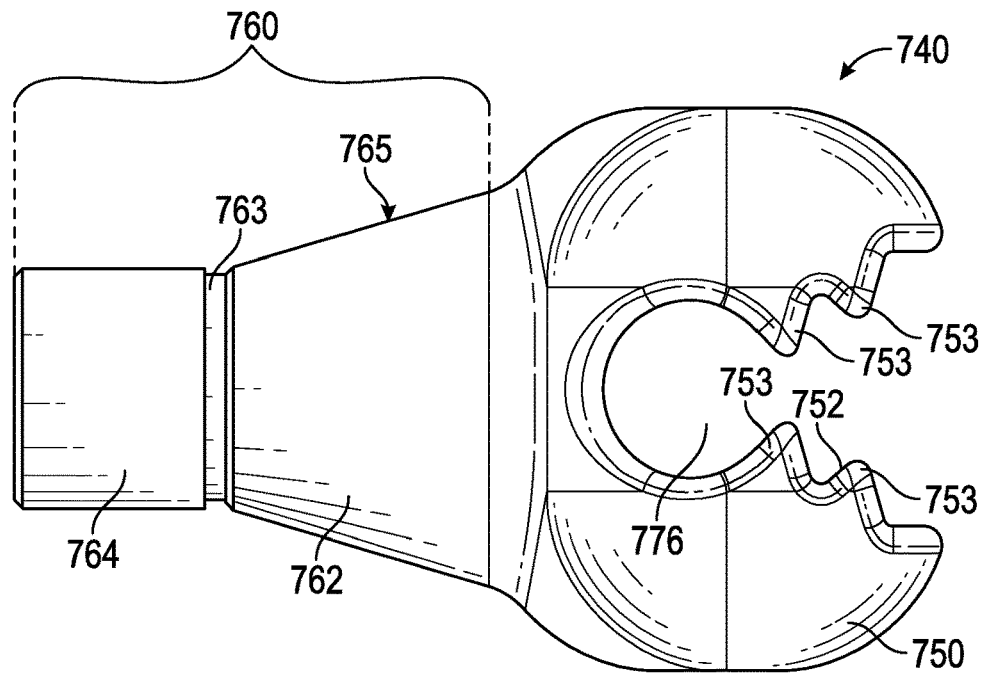
FIG. 6 is a side view of the component interfacing fixture of FIGS. 2-4 looking along the receiving slot.
Figure 7:
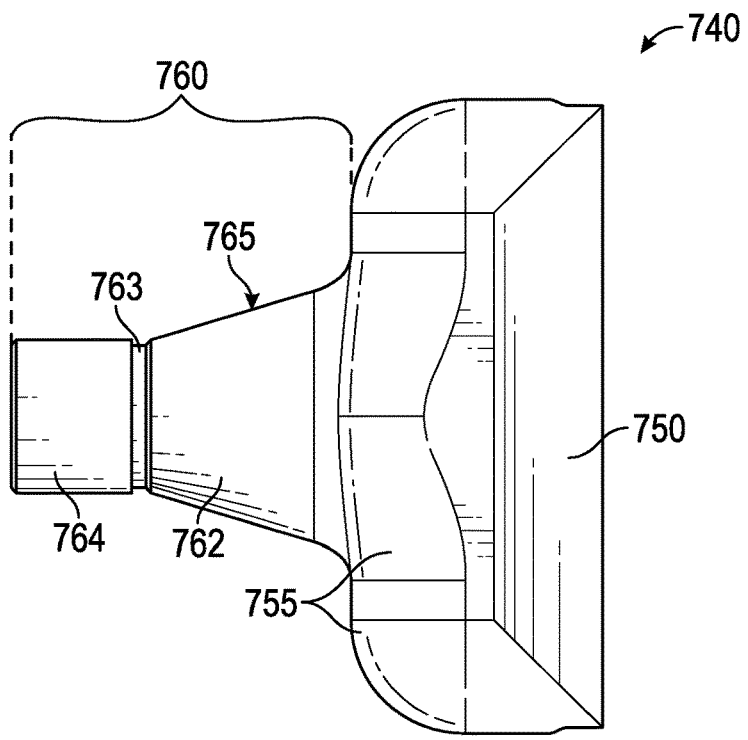
FIG. 7 is a top view of the component interfacing fixture of FIG. 6

FIG. 6 is a side view of the component interfacing fixture 740 of FIGS. 2-4 looking along the receiving slot, and FIG. 7 is a top view of the component interfacing fixture 740 of FIG. 6. Referring to FIGS. 3, 4, 6, and 7, the stem 760 may extend from the interfacing portion 750 and may extend in the direction opposite the receiving slot 752. The stem 760 may include a tapered portion 762 and a fastening portion 764. The tapered portion 762 may be adjacent the interfacing portion 750. The tapered portion 762 may have a frustoconical shape. The tapered portion 762 mates with the block tapered bore 722 and the block tapered bore wall 724.

The fastening portion 764 may extend from the narrow end of the tapered portion 762 in the direction opposite the interfacing portion 750. The fastening portion 764 may be threaded or may include other types of fastening features.

The stem 760 may also include a stem tapered surface 765 that may be the outer surface of the tapered portion 762. The stem tapered surface 765 may be a frustoconical surface and may mate with the block tapered surface 725 when the stem 760 is inserted into the block tapered bore 722. The larger diameter of the stem tapered surface 765 may be adjacent the interfacing portion 750 and the smaller diameter of the stem tapered surface may be adjacent the fastening portion 764.

Referring to FIGS. 3 and 4, the component interfacing fixture 740 may also include a loading bore 770. The loading bore 770 may be used with the loading mechanism 780 to secure the component 800 in the receiving slot 752. The loading bore 770 may extend through the stem 760 and into the interfacing portion 750 to the receiving slot 752.

The loading bore 770 may include a loading counterbore 772, a threaded portion 774, and a spanner slot 776. The loading counterbore 772 may extend into the stem 760 at the fastening portion 764. The threaded portion 774 may be adjacent the loading counterbore 772, extending from the loading counterbore 772 to the spanner slot 776. The spanner slot 776 may be located between the threaded portion 774 and the receiving slot 752, may be adjacent the threaded portion 774, and may be adjacent the receiving slot 752.

The loading mechanism 780 may apply a load to the component 800 to secure the component 800 into the receiving slot 752. In the embodiment illustrated in FIGS. 3 and 4, the loading mechanism 780 includes a set screw 782 and a spanner 784. The spanner 784 may be located in the spanner slot 776. The set screw 782 may be inserted into and threaded into the threaded portion 774. After the component 800 is inserted into the receiving slot 752 the set screw 782 may be threaded further into the threaded portion 774 so as to press the spanner 784 into the component 800 and apply a load to the component 800. The load may be set to simulate the loading conditions of the component 800 within the industrial machine during operation of the industrial machine.

The testing fixture 700 may also include a fastener 704 and a washer 702. The fastener 704 may be fastened to the fastening portion 764 to secure the component interfacing fixture 740 to the fixture block 710. In the embodiment illustrated, the fastener 704 is a threaded nut that threads on to the end of the fastening portion 764. The fastener 704 may apply a load that pulls the tapered portion 762 and stem tapered surface 765 into an interference condition with the block tapered bore wall 724 and the block tapered surface 725. This load may prevent the component interfacing fixture 740 from rotating relative to the fixture block 710.

As illustrated in FIG. 7, the component interfacing fixture 740 may include various rounds and contours, which may serve to reduce the weight of the component interfacing fixture 740. In the embodiment illustrated, the interfacing portion 750 is elongated to accommodate the length of the root 816. The ends of the interfacing portion 750 are rounded and the middle portion of the interfacing portion 750 is bulbous, which may provide the required structure about the spanner slot 776.

Figure 8:
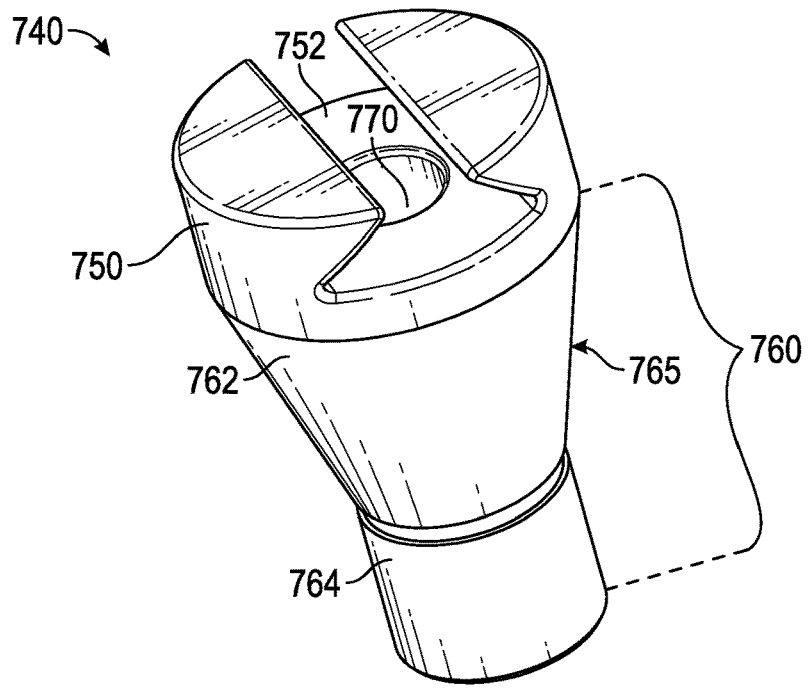
FIG. 8 is a further embodiment of the component interfacing fixture.

FIG. 8 is a further embodiment of the component interfacing fixture 740. In the embodiment illustrated in FIG. 8, the interfacing portion 750 includes a cylindrical shape. The cylindrical shape may have the same diameter as the largest diameter of the tapered portion 762. In the embodiment shown, the receiving slot 752 includes a dovetail shape. However, other retaining shapes and features can also be used. The loading bore 770 is a cylindrical bore extending through the stem 760 to the receiving slot 752.

FIG. 9 is another embodiment of the component interfacing fixture 740. In the embodiment illustrated in FIG. 9, the interfacing portion 750 includes a cylindrical shape and the receiving slot 752 includes a cylindrical bore. The cylindrical shape may thus be a hollow cylinder and may have the same diameter as the largest diameter of the tapered portion 762. The receiving slot 752 may extend through the tapered portion 762 and may extend into or through the fastening portion 764. The receiving slot 752 may be configured to hold a component 800 that has a cylindrical base or shaft, such as the shaft of an inlet or variable guide vane of a rotary machine.

In this embodiment, the loading mechanism 780 may include dividing slots 788. The dividing slots 788 may extend radially through the interfacing portion 750, subdividing the interfacing portion 750 into multiple sections 758. The radial direction may be relative to the axis of the receiving slot 752 and of the interfacing portion 750 illustrated by reference axis 799. Each section 758 may be a sector of the hollow cylinder shape of the interfacing portion 750. The dividing slots 788 may also extend radially through a portion of the stem 760, such as radially through a portion of the tapered portion 762, relative to the reference axis 799. In the embodiment illustrated, the dividing slots 788 extend through the tapered portion 762 to the fastening portion 764 in the axial direction relative to the reference axis 799, and each section 758 includes a portion of the interfacing portion 750 and a portion of the transition portion 763.

The dividing slots 788 may be wide enough so that the diameter of the receiving slot 752 will get smaller when the component interfacing fixture 740 is affixed to the block body 712 and a load is applied to the tapered portion 762 by tightening the fastener 704. The load may pull the tapered portion 762 further into the block tapered bore 722 and into an interference condition with the block tapered bore wall 724 which may push the sections 758 closer together causing the diameter of the receiving slot 752 to get smaller and clamp onto a root 816 of the component 800. To fit within the receiving slot 752 of this embodiment, the root 816 may be a portion of the component 800, such as a shaft.

Figure 10:
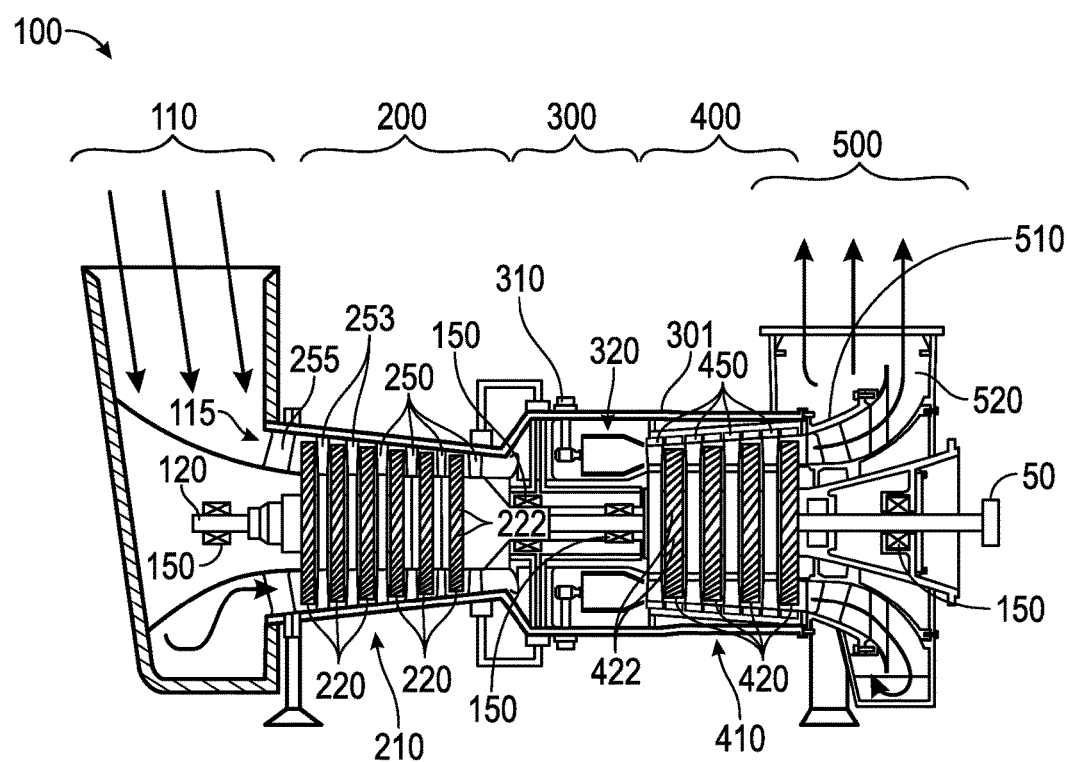
FIG. 10 is a schematic illustration of an exemplary industrial machine.

FIG. 10 is a schematic illustration of an exemplary industrial machine. As illustrated, the industrial machine is a rotary machine, and in particular is a gas turbine engine 100. A gas turbine engine 100 includes an inlet 110, a shaft 120, a compressor 200, a combustor 300, a turbine 400, an exhaust 500, and a power output coupling 50.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades 222. Stators 250 axially follow each of the compressor disk assemblies 220. Each compressor disk assembly 220 paired with the adjacent stators 250 that follow the compressor disk assembly 220 is considered a compressor stage. Some of the stators 250 may be variable guide vanes 253. Compressor 200 includes multiple compressor stages. Inlet guide vanes 255 axially precede the compressor stages. The variable guide vanes 253 and the inlet guide vanes 255 may rotate about a shaft so that the position of their airfoils may be changed depending on the operating conditions of the gas turbine engine 100.

The combustor 300 includes a combustion chamber 320 and one or more fuel injectors 310. The fuel injectors 310 may be upstream of the combustion chamber 320 and may be annularly arranged about the axis of the gas turbine engine 100.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades 422. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 50 may be located at an end of shaft 120.

INDUSTRIAL APPLICABILITY

Components for industrial machines, such as the rotating components and the components within the flow path through the gas turbine engine 100 described above, often operate under extreme heat and pressure. Failure of these components may result in a catastrophic failure of the industrial machine. Thus, these components need to be tested so that owners, operators, and manufacturers know when to replace them.

Fixtures used for testing components are often large and heavy. These fixtures may be difficult to move around, require a significant amount of storage space, and may take time to develop. Further, the upper limit of force that a shaker table can provide may limit the size and weight of the components that can be tested on it. The majority of the weight of the testing fixture 700 is separated into the fixture block 710 and the component interfacing fixture 740. This separation may significantly reduce the weight that an operator needs to lift at any given time.

The component interfacing fixture 740 may be a modular part. The fixture block 710 may be standardized to mate with multiple component interfacing fixtures 740 designed for holding a number of different components 800 for multiple industrial machines. This may allow the fixture block 710 to remain affixed to the mounting plate 620 of the testing mechanism 600 no matter which of the components 800 will be tested. Only the component interfacing fixture 740 needs to be changed to accommodate a different component 800. This modular set up also reduces the amount of storage required, since only the component interfacing fixtures 740 need to be stored.

Figure 11:
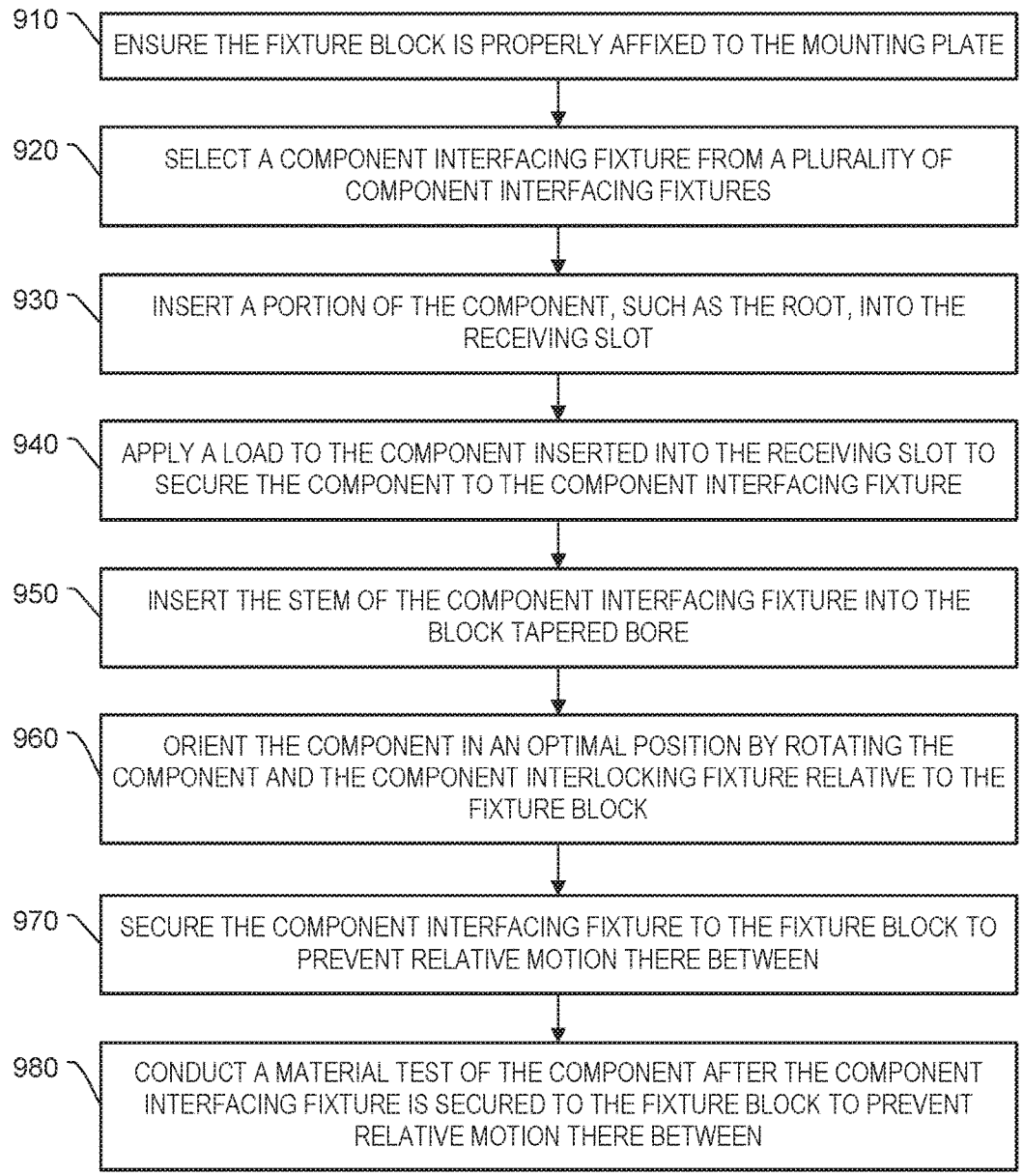
FIG. 11 is a flowchart of a method for testing a component 800 using the testing fixture 700 of FIGS. 1-10.

FIG. 11 is a flowchart of a method for testing a component 800 using the testing fixture 700 of FIGS. 1-10. The method may include ensuring the fixture block 710 is properly affixed to the mounting plate 620 at step 910. Step 910 may include securing the fixture block 710 to the mounting plate 620 or checking the fasteners of a fixture block 710 previously secured to the mounting plate 620 to ensure they are sufficiently tightened.

The method may also include selecting a component interfacing fixture 740 from a plurality of component interfacing fixtures 740 at step 920. When a new component 800 is developed, step 920 may include modeling and forming the component interfacing fixture 740. To save time, blanks may include a preformed stem 760 and an interfacing portion 750 that has not been formed yet. The component interfacing fixture 740 may then be formed by machining the interfacing portion 750 to include receiving slot 752 and other features needed to secure the new component 800 to the component interfacing fixture 740. Having blanks with preformed stems 760 may save time between design and testing and help speed up the overall design process of a component 800.

The method may further include inserting a portion of the component 800, such as the root 816, into the receiving slot 752 at step 930. If the testing fixture 700 was previously used, a previously tested component 800 may need to be removed prior to step 930.

The method may yet further include applying a load to the component 800 inserted into the receiving slot 752 to secure the component 800 to the component interfacing fixture 740 at step 940. The load may be applied by a loading mechanism 780, such as by inserting a spanner 784 below the receiving slot 752 and pressing the spanner 784 against the root 816 of the component 800 by threading a set screw 782 into the threaded portion 774. The load applied may retain the root 816 in the receiving slot 752. The spanner 784 may press the root 816 away from the stem 760 and into the root retention feature 753 of the receiving slot 752 to simulate the loading of the component 800, such as a rotary blade during operation of a rotary machine. Simulating the load applied to the component 800 while the industrial machine is operating may improve the accuracy of the material test.

The method may still further include inserting the stem 760 of the component interfacing fixture 740 into the block tapered bore 722 at step 950. If the testing fixture 700 was previously used, a previously used component interfacing fixture 740 may need to be removed prior to step 930.

The method may also include orienting the component 800 in an optimal position by rotating the component 800 and the component interfacing fixture 740 relative to the fixture block 710 at step 960. The optimal position of the component 800 may be a predetermined position of the component 800 relative to the fixture block 710 or relative to the mounting plate 620. The optimal position may be predetermined using a variety of methods including solid modeling, mathematical determinations, empirical observations, and combinations thereof. Orienting the component 800 in an optimal position may reduce the amount of forces needed to perform the material test and may allow heavier objects to be tested at the upper limits of the forces that the testing mechanism is capable of supplying.

The method may further include securing the component interfacing fixture 740 to the fixture block 710 to prevent relative motion there between at step 970. Step 970 may include securing a fastener 704 to the fastening portion 764 and tightening the fastener 704 on the back side of the block tapered bore wall 724 to bring the tapered portion 762 into an interference condition with the block tapered bore wall 724, and to increase the friction between the block tapered surface 725 and the stem tapered surface 765. The back side of the block tapered bore wall 724 may be at the block back surface 718 or may be at the annular surface 721 in the interior of the block counterbore 720. The fastener 704 may tighten against the block back surface 718 or the annular surface 721.

The method may yet further include conducting a material test of the component 800 after step 970 is completed at step 980. In some embodiments, the mounting plate 620 is affixed to a high cycle fatigue testing mechanism 610, such as a shaker table, and step 980 includes performing a high cycle fatigue test on the component 800. In other embodiments, step 980 includes affixing a modal testing mechanism 630 to the interfacing portion 750 of the component interfacing fixture 740, and step 980 includes performing a modal test on the component 800. Affixing the modal testing mechanism 630 to the interfacing portion 750 may reduce the number of times the forces from the modal testing mechanism 630 are transferred between objects and may reduce the distance between the component 800 and the modal testing mechanism 630. Such reductions may reduce losses in the transferred forces and may increase the accuracy of the modal test.

It is understood that the steps disclosed herein (or parts thereof) may be performed in the order presented or out of the order presented, unless specified otherwise. For example, steps 930 and 950 may be performed in any order. Likewise, it is understood that multiple steps may be performed concurrently or combined into a single step. For example, in the embodiment described in accordance with FIG. 9, the steps of inserting the stem 760 into the block tapered bore 722 and securing the component interfacing fixture 740 to the fixture block 710 may be performed concurrently by tightening the fastener 704 up against the block tapered bore wall 724 causing the interference fit described above and causing the sections 758 to clamp down onto the component 800.

Further, it is understood that single steps may be subdivided. A subdivided step may be performed partially before and partially after another step. For example, step 970 may be performed in two parts. Securing the fastener 704 to the fastening portion 764 may be performed prior to the step of orienting the component 800 in the optimal position, while tightening the fastener 704 on the back side of the block tapered bore wall 724 to prevent relative rotation between the block tapered bore wall 724 and the tapered portion 762 may be performed afterward so as to secure the component 800 in the optimal position. It is also understood that some steps may be omitted or may only need to be performed once when conducting multiple tests using the method disclosed herein.

The preceding detailed description is merely exemplary in nature and is not intended to limit the invention or the application and uses of the invention. The described embodiments are not limited to use in conjunction with components of a particular type of industrial machine. Although the present disclosure, for convenience of explanation, depicts and describes particular embodiments of the testing mechanism and the testing fixture, it will be appreciated that the testing mechanism and testing fixture in accordance with this disclosure can be implemented in various other configurations, and can be used to test components of other types of machines. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A testing fixture for testing a component of an industrial machine, the testing fixture comprising:
   a fixture block including
      a block body including a block front surface, and
      a block tapered bore extending into the block body from the block front surface having a block tapered bore wall, the block tapered bore wall including a block tapered surface with a first frustoconical shape within the block body where the larger diameter of the first frustoconical shape is adjacent the block front surface;
   a component interfacing fixture including
      an interfacing portion including a receiving slot that receives a root of the component, and
      a stem extending from the component interfacing fixture opposite the receiving slot, the stem including
         a tapered portion including a stem tapered surface with a second frustoconical shape where the larger diameter of the second frustoconical shape is adjacent the interfacing portion and
         a threaded portion distal to the interfacing portion, wherein the stem inserts into the fixture block such that the stem tapered surface mates with the block tapered surface;
   a fastener that couples to the threaded portion adjacent the block body opposite the block front surface; and
   a loading mechanism that applies a load to the root of the component to secure the root within the receiving slot.

2. The testing fixture of claim 1, wherein the block body includes a block back surface opposite the block front surface, a counterbore extending into the block body from the block back surface to the block tapered bore wall, and an annular surface at the interior of the counterbore and at the back side of the block tapered bore wall; and wherein the fastener tightens against the annular surface.

3. The testing fixture of claim 1, wherein the component interfacing fixture includes a loading bore extending through the stem to the receiving slot, the loading bore including a threaded portion and a spanner slot located between the receiving slot and the fastening portion; and wherein the loading mechanism includes a spanner that locates into the spanner slot and a set screw that threads into the threaded portion and presses the spanner against the root of the component to apply the load to retain the root in the receiving slot.

4. The testing fixture of claim 3, wherein the component is a rotary blade of a rotary machine; wherein the receiving slot has a root retention feature and the root has a root retention shape; and wherein the spanner presses the root away from the stem and into the root retention feature of the receiving slot to simulate the loading of the rotary blade during operation of the rotary machine.

5. The testing fixture of claim 1, wherein the component is a bladed component, the root includes a first cylindrical shape, the receiving slot includes a second cylindrical shape, and the loading mechanism includes dividing slots that extend through the interfacing portion and into the stem relative to an axial direction of the receiving slot, the dividing slots subdividing the interfacing portion and a portion of the stem into sections; and wherein the tapered portion is pulled into an interference condition with the block tapered bore wall when the fastener is tightened against the block body causing the sections to clamp down onto the root.

6. The testing fixture of claim 1, wherein the block body includes a block top surface and two block side surfaces that are adjacent surfaces to the block front surface; and wherein the block top surface and the two block side surfaces form a parabolic cylinder.

7. The testing fixture of claim 6, wherein the block body includes a block bottom surface opposite the block top surface and block bolt holes extending through the block body on each side of the block tapered bore from the block top surface to the block bottom surface, and wherein the block bolt holes are used to secure the block body to a mounting plate of a testing mechanism.

8. A testing fixture for testing a component of an industrial machine with a testing mechanism, the testing fixture comprising:
   a fixture block including
      a block body including a block front surface, a block top surface and a block bottom surface,
      a block tapered bore extending into the block body from the block front surface forming a block tapered bore wall, the block tapered bore wall including a block tapered surface with a first frustoconical shape within the block body where the larger diameter of the first frustoconical shape is adjacent the block front surface, and
      bolt holes for securing the block body to a mounting plate, the bolt holes extending through the block body on each side of the block tapered bore from the block top surface to the block bottom surface;
   a component interfacing fixture including
      an interfacing portion including a receiving slot that receives a root of the component, and
      a stem extending from the component interfacing fixture opposite the receiving slot, the stem including a tapered portion including a stem tapered surface with a second frustoconical shape where the larger diameter of the second frustoconical shape is adjacent the interfacing portion and a threaded portion distal to the interfacing portion, wherein the stem inserts into the fixture block such that the stem tapered surface mates with the block tapered surface;

a fastener that couples to the threaded portion and pulls the tapered portion into an interference condition with the block tapered bore wall when the fastener is tightened against the block body; and a loading mechanism that applies a load to the root of the component to secure the root within the receiving slot.

9. The testing fixture of claim 8, wherein the component interfacing fixture can rotate relative to the block body when the stem is inserted into the fixture block prior to tightening the fastener against the block body.

10. The testing fixture of claim 8, wherein the testing mechanism is a high cycle fatigue testing mechanism, the testing mechanism including the mounting plate.

11. The testing fixture of claim 8, wherein the testing mechanism is a modal testing mechanism that affixes to the interfacing portion adjacent to the component.

12. The testing fixture of claim 8, wherein the component interfacing fixture includes a loading bore extending through the stem to the receiving slot, the loading bore including a threaded portion and a spanner slot located between the receiving slot and the threaded portion; and wherein the loading mechanism includes a spanner that locates into the spanner slot and a set screw that threads into the threaded portion and presses the spanner against the root of the component to apply the load to retain the root in the receiving slot.

13. The testing fixture of claim 8, wherein the root includes a first cylindrical shape, the receiving slot includes a second cylindrical shape, and the loading mechanism includes dividing slots that extend through the interfacing portion and into the stem relative to an axial direction of the receiving slot, the dividing slots subdividing the interfacing portion and a portion of the stem into sections; and wherein the sections clamp down onto the root when the fastener is tightened against the block body.

14. A method for testing a component for an industrial machine using a testing fixture including a fixture block and a component interfacing fixture, the method comprising:

inserting a root of the component into a receiving slot formed in an interfacing portion of the component interfacing fixture;

applying a load to the root with a loading mechanism to secure the component to the component interfacing fixture;

inserting a stem of the component interfacing fixture into a block tapered bore of the fixture block, the block tapered bore extending into a block body of the fixture block from a block front surface of the block body and forming a block tapered bore wall with a block tapered surface that includes a first frustoconical shape with the larger diameter of the block tapered bore wall adjacent the block front surface, and the stem extending from the interfacing portion and including a tapered portion with a stem tapered surface that includes a second frustoconical shape with the larger diameter of the stem tapered surface adjacent the interfacing portion, the stem tapered surface mating with the block tapered surface;

securing the component interfacing fixture to the fixture block to prevent relative motion there between at step by securing a fastener to a fastening portion of the stem that is distal to the interfacing portion and tightening the fastener on the back side of the block tapered bore wall; and conducting a material test of the component after the component interfacing fixture is secured to the fixture block to prevent relative motion there between.

15. The method of claim 14, further comprising orienting the component in an optimal position by rotating the component and the component interfacing fixture relative to the fixture block prior to tightening the fastener on the back side of the block tapered bore wall.

16. The method of claim 14, further comprising selecting the component interfacing fixture from a plurality of component interfacing fixtures, wherein said component interfacing fixture is a modular part.

17. The method of claim 14, wherein the fixture block is affixed to a mounting plate of a high cycle fatigue testing mechanism, and conducting a material test of the component includes performing a high cycle fatigue test on the component.

18. The method of claim 14, further comprising affixing a modal testing mechanism to the interfacing portion adjacent to the component, and wherein conducting a material test of the component includes performing a modal test on the component.

19. The method of claim 14, wherein the component interfacing fixture includes a loading bore extending through the stem to the receiving slot, the loading bore including a threaded portion and a spanner slot located between the receiving slot and the threaded portion, and the loading mechanism includes a spanner and a set screw; and wherein applying a load to the root includes inserting the spanner into the spanner slot and threading the set screw into the threaded portion to press the spanner against the root which applies a load that retains the root in the receiving slot and secures the component to the component interfacing fixture.

20. The method of claim 14, wherein the root includes a first cylindrical shape, the receiving slot includes a second cylindrical shape, and the loading mechanism includes dividing slots that extend through the interfacing portion and into the stem relative to an axial direction of the receiving slot, the dividing slots subdividing the interfacing portion and a portion of the stem into sections; and wherein securing the component interfacing fixture to the fixture block to prevent relative motion there between includes tightening the fastener against the block body which brings the tapered portion into an interference condition with the block tapered bore wall causing the sections to clamp down onto the root.

* * * * *